United States Patent
Pauli et al.

(10) Patent No.: US 12,411,035 B2
(45) Date of Patent: Sep. 9, 2025

(54) FLOW METER

(71) Applicant: Kamstrup A/S, Skanderborg (DK)

(72) Inventors: Bjarke Brogaard Pauli, Skanderborg (DK); Daniel Rømer Beck, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 295 days.

(21) Appl. No.: 18/146,498

(22) Filed: Dec. 27, 2022

(65) Prior Publication Data

US 2023/0204399 A1 Jun. 29, 2023

(30) Foreign Application Priority Data

Dec. 29, 2021 (EP) .................................... 21218188

(51) Int. Cl.
*G01F 1/84* (2006.01)
(52) U.S. Cl.
CPC .......... *G01F 1/8436* (2013.01); *G01F 1/8431* (2013.01)
(58) Field of Classification Search
CPC .............................. G01F 1/8436; G01F 1/8431
USPC ....................................................... 73/861.356
See application file for complete search history.

(56) References Cited

U.S. PATENT DOCUMENTS

| 8,994,552 B2 | 3/2015 | Jiang et al. | |
| 11,703,367 B2 * | 7/2023 | Pilegaard | G01F 1/662 73/861.28 |
| 2014/0118161 A1 | 5/2014 | Jiang et al. | |
| 2019/0226892 A1 | 7/2019 | Kuhlemann et al. | |
| 2021/0223077 A1 * | 7/2021 | Liu | G01F 1/662 |

FOREIGN PATENT DOCUMENTS

| CN | 211651723 U | 10/2020 | | |
| CN | 112384763 A | 2/2021 | | |
| EP | 3591347 A1 * | 1/2020 | ............. | G01F 1/662 |
| WO | WO-2013079674 A1 * | 6/2013 | ........... | G01F 15/007 |

\* cited by examiner

*Primary Examiner* — Peter J Macchiarolo
*Assistant Examiner* — Rodney T Frank
(74) *Attorney, Agent, or Firm* — McGlew and Tuttle, P.C.

(57) ABSTRACT

A flow meter including a flow tube element with sensors configured to generate signals for measuring a fluid flow through the flow tube element. An electronics housing with a mounting side is releasably mounted to the flow tube element. The electronics housing accommodates a battery and electronics. The electronics and the sensors are powered by the battery, located in a battery cartridge that is arranged within the electronics housing and is removable through the mounting side with the housing unmounted from the flow tube element. A first anti-tampering element is arranged between a first part of the electronics and the battery cartridge. A second anti-tampering element is mounted to the flow tube element independently from the electronics housing. The second anti-tampering element and a second part of the electronics remain mounted to the flow tube element with the electronics housing unmounted from the flow tube element.

20 Claims, 10 Drawing Sheets

FLOW METER

CROSS REFERENCE TO RELATED APPLICATIONS

This application claims the benefit of priority under 35 U.S.C. § 119 of European Application 21218188.7, filed Dec. 29, 2021, the entire contents of which are incorporated herein by reference.

TECHNICAL FIELD

The present invention is directed to flow meters, in particular to battery-powered ultrasonic flow meters configured to measuring high fluid flows and to automatically transmit wirelessly consumption values. The types of flow meters covered by this disclosure are ultrasonic flow meters, magnetic inductive flow meters, vortex flow meters, Coriolis mass flow meters, or other types of flow meters.

TECHNICAL BACKGROUND

Large flow meters typically used in commercial, municipal and/or industrial applications are often expensive, because their large flow tube is typically made of cast steel. Longevity is therefore of particular importance for such large flow meters. It is nowadays expected by commercial, municipal and/or industrial customers that battery-powered flow meters have a life span of ten years or more.

It is known that utility providers of water, gas and/or thermal energy use automatic meter reading (AMR) systems or advanced meter infrastructure (AMI) systems to efficiently and reliably manage customer billing. Such systems may be referred to as "dedicated" meter reading systems. Dedicated meter reading systems are characterized in that consumption meters are installed in a plurality of locations and communicate consumption data to a head-end-system (HES) via a wireless communication with dedicated data collectors. A single data collector may collect the consumption data read by thousands of consumption meters. Several data collectors may be distributed over a city or region to cover all consumption meters located therein. Typically, the consumption meters communicate with the data collectors wirelessly using license-free frequency bands in a manner that saves as much battery-power of the consumption meters as possible, because there is usually no opportunity for recharging or exchanging the consumption meter battery. It is therefore a constant challenge to be able to guarantee a minimum battery lifetime, for example of at least 10, 15 or preferably even 20 years with hourly or daily readings.

In order to reduce the cost of implementing and maintaining an infrastructure of dedicated data collectors, a public cellular communications network may be used instead of dedicated data collectors to collect the consumption data. For instance, the consumption meters may comprise a connection module, e.g. a modem, to connect to a Low Power Wide Area Network (LPWAN) provided by a public cellular communications network, e.g. a Narrowband Inter-net-of-Things (NB-IoT) or Long-term Evolution Machine Type Communication (LTE-M) network, e.g. LTE Cat NB1, LTE Cat NB2, LTE Cat M1 or LTE Cat M2. The frequency bands used in such a LPWAN are licensed, but have a large link budget. It is therefore desirable to provide a battery-powered consumption meter that is able to efficiently register consumption data regularly via a LPWAN, e.g. hourly or once per day, over a guaranteed minimum lifetime, e.g. 8 or 10 years.

In contrast to "dedicated" meter reading systems that "own" (includes lease) the data collector infrastructure, a public cellular communications network is part of a "generic" meter reading system, in which the wireless communication infrastructure between the consumption meter and the HES, i.e. the LPWAN, is owned, maintained and controlled by external parties, e.g. mobile network operators (MNO). Using a generic meter reading system, a utility provider (UP) of water, gas and/or thermal energy only owns (or leases), maintains and controls the consumption meters and the HES, but not the LPWAN between them.

Especially a cellular communication via a "generic" meter reading system using a Low Power Wide Area Network (LPWAN) provided by a public cellular communications network, e.g. NB-IOT, is very challenging in terms of energy consumption.

There is thus a certain risk that a large expensive flow meter of a commercial, municipal and/or industrial customer uses up too much energy for radio transmission and has to be exchanged prematurely. One solution to this problem may be to make the battery rechargeable via cables and terminals leading from an outside power supply to the interior battery. This may, however, lead to frequent charging sessions and a potential degradation of the battery over time.

Another solution may be to replace only the battery by a new one, but implies that a user or a service technician must penetrate into the inside of the flow meter. This, however, opens up other problems, i.e. on one hand an access to electronics that are regulated by authorities and on the other hand a risk of tampering. For example, U.S. Pat. No. 8,994,552 B2 describes an all-electric utility gas meter with a separate battery chamber accommodating an exchangeable battery. Such a solution, however, would require too many fundamental modifications to the Applicant's typical cylindric flow meter design.

Usually, tampering of flow meters is prevented by not allowing access to or opening of the flow meter by using a non-exchangeable battery. However, the flow meter must apply self-restrictions of radio transmission to guarantee a minimum life span with a non-exchangeable and non-rechargeable battery.

SUMMARY

It is thus an object of the present invention to provide a battery-powered flow meter that needs less self-restrictions of radio transmission and that is protected against tampering.

The battery of the flow meter according to the present disclosure is exchangeable and its electronics is protected against tampering.

According to a first aspect of the present disclosure, a flow meter is provided comprising:
  a flow tube element comprising sensors configured and arranged to generate signals for measuring a fluid flow through the flow tube element; and
  an electronics housing comprising a mounting side, wherein the mounting side is releasably mounted directly or indirectly to the flow tube element, wherein the electronics housing accommodates a battery and electronics, wherein the electronics and/or the sensors are powered by the battery.

The flow meter is characterized in that the battery is located in a battery cartridge, wherein the battery cartridge is arranged in an operating position within the electronics housing and removable from the electronics housing through the mounting side when the electronics housing is unmounted from the flow tube element. The flow meter is further characterized in that a first part of the electronics is protected against tampering by a first anti-tampering element being arranged between the first part of the electronics and the battery cartridge in the operating position. The flow meter is further characterized in that a second part of the electronics is protected against tampering by a second anti-tampering element being mounted directly or indirectly to the flow tube element independently from the electronics housing, so that the second part of the electronics and the second anti-tampering element remain mounted to the flow tube element when the electronics housing is unmounted from the flow tube element.

The battery of the flow meter can be easily and safely replaced by unmounting the electronics housing from the flow tube element and taking the battery cartridge out of the unmounted electronics housing. It may be possible that the battery cartridge may stick on the second anti-tampering element and remain in electrical connection with the second part of the electronics when the electronics housing is unmounted from the flow tube element. The battery cartridge can then be pulled off easily for replacement. The battery cartridge may contain one or more batteries, which may be fixed to the cartridge or releasable therefrom. It is possible to replace one or more or all of the batteries only, or the battery cartridge as a unit together with the one or more batteries therein.

Optionally, the second anti-tampering element may be essentially cup-shaped and/or the second part of the electronics may reside at least partly within a cavity of the flow tube element. The second anti-tampering element may be nested within the electronics housing as long as the electronics housing is mounted to the flow tube element.

Optionally, the first anti-tampering element may be essentially disc-shaped and may separate a first cavity within the electronics housing from a second cavity within the electronics housing, wherein the first cavity is inaccessible and contains the first part of the electronics, and wherein the second cavity is accessible though the mounting side and contains the removable battery cartridge. The first anti-tampering element may comprise one or more openings through which an electrical connection between the battery and the first part of the electronics may lead.

Optionally, a third cavity may be defined in the electronics housing between the battery cartridge in the operating position and the mounting side of the electronics housing, wherein the second anti-tampering element and/or the second part of the electronics reside(s) at least partly within the third cavity.

Optionally, the first part of the electronics may be located on a first printed circuit board, PCB, and wherein second part of the electronics may be located on a second printed circuit board, PCB.

Optionally, the first PCB and/or the second PCB may be arranged parallel to each other and/or parallel to the mounting side of the electronics housing. So, the PCBs preferably extend in parallel planes, preferably in parallel to the mounting side of the electronics housing. This has the advantage that the battery cartridge is inserted into the electronics housing and removed from the electronics housing essentially perpendicular to the first PCB, so that an electrical connection can be achieved by one or more male connector(s) extending perpendicular to the first PCB. The male connector(s) may be contact knives or pins as part of the battery cartridge. The first PCB may comprise corresponding female connector(s) for receiving the male connector(s) of the battery cartridge. Alternatively, or in addition, the first PCB may comprise male connector(s) and the battery cartridge may comprise corresponding receiving female connector(s) for receiving the male connector(s) of the first PCB. The electrical connection between the first PCB and the battery cartridge may also provide for a frictional mechanical connection that is manually releasable when the battery cartridge is manually pulled out of the electronics housing.

Optionally, the flow tube element comprises a metallic main body defining a flow tube, pipe mounting flanges, sensor cavities accommodating the sensors and a mounting portion to which the electronics housing is releasably mounted. Preferably, the pipe mounting flanges are coaxially arranged to each other, so that the flow tube defines a main flow direction. The electronics housing is preferably mounted essentially perpendicular to the main flow direction, so that the mounting side of the electronics housing faces towards a central flow axis of the flow tube element extending along the main flow direction.

Optionally, the second anti-tampering element may be directly or indirectly fixed to the main body at the mounting portion of the main body. Preferably, the second anti-tampering element is cup-shaped and mounted to a glass or plastic base plate comprising through-going electrical contacts. The base plate may be fixed to the flow tube element by a ring mount. The second anti-tampering element may be fixed to the base plate by a screw comprising a screw head being at least partially sunk into the second anti-tampering element. The screw head may be covered by a security seal in form of a vulnerable sticker.

Optionally, the second part of the electronics may be located closer to the flow tube element than the first part of the electronics, wherein the battery cartridge in the operating position is located between the first part of the electronics and the second part of the electronics. The electronics housing may preferably have a cup-shape defining a longitudinal axis perpendicular to the mounting side and/or the main flow axis.

Optionally, the first anti-tampering element may be fixed within the electronics housing. Preferably, the first anti-tampering element is inserted into the electronics housing from a top side opposite to the mounting side, wherein the top side is closed by a closing lid after the first cavity is fully equipped with the first part of the electronics during manufacturing and assembling of the flow meter. The first anti-tampering element preferably rests on one or more support surface(s) defined by the electronics housing in the second cavity and facing away from the mounting side.

Optionally, the battery cartridge may define a desiccant cavity at least partly filled with a desiccant. This is particularly beneficial if the battery cartridge is exchanged as a whole unit, because the desiccant is then replaced automatically with each battery replacement.

Optionally, the battery cartridge may comprise an electrical connection protruding through an opening in the first anti-tampering element to connect to the first part of the electronics and protruding through an opening in the second anti-tampering element to connect to the second part of the electronics. So, the second part of the electronics may be powered via the first part of the electronics, or vice versa.

Optionally, the electronics housing may define at least one inner positive fit element engaging with at least one corresponding outer positive fit element of the battery cartridge for guiding the battery cartridge into and out of the operating position in a well-defined manner. The form fit elements preferably extend along the longitudinal axis of the electronics housing, i.e., perpendicular to the mounting side.

Preferably, an axial (upper) end of one or more of the inner positive fit element(s) may define a support surface for the first anti-tampering element to rest on.

Optionally, the second anti-tampering element defines at least one positive fit element engaging with at least one corresponding positive fit element of the battery cartridge for guiding the electronics housing in a well-defined manner when it is mounted to the flow tube element. The form fit elements preferably extend along the longitudinal axis of the electronics housing, i.e., perpendicular to the mounting side.

Optionally, the electronics housing may comprise a closing lid at a side opposite to the mounting side and forms a cup-shape only accessible through the mounting side when the electronics housing is unmounted from the flow tube element. This has the advantage that the electronics housing cannot be opened as long as it is mounted to the flow tube element.

Optionally, the electronics housing may comprise a mounting flange at the mounting side of the electronics housing.

Optionally, the first part of the electronics may be configured to display values and/or transmit wirelessly values to an automatic reading system, wherein the second part of the electronics is configured to receive and/or process the signals generated by the sensors.

Optionally, the flow meter may be an ultrasonic flow meter, wherein the sensors are ultrasonic transducers.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
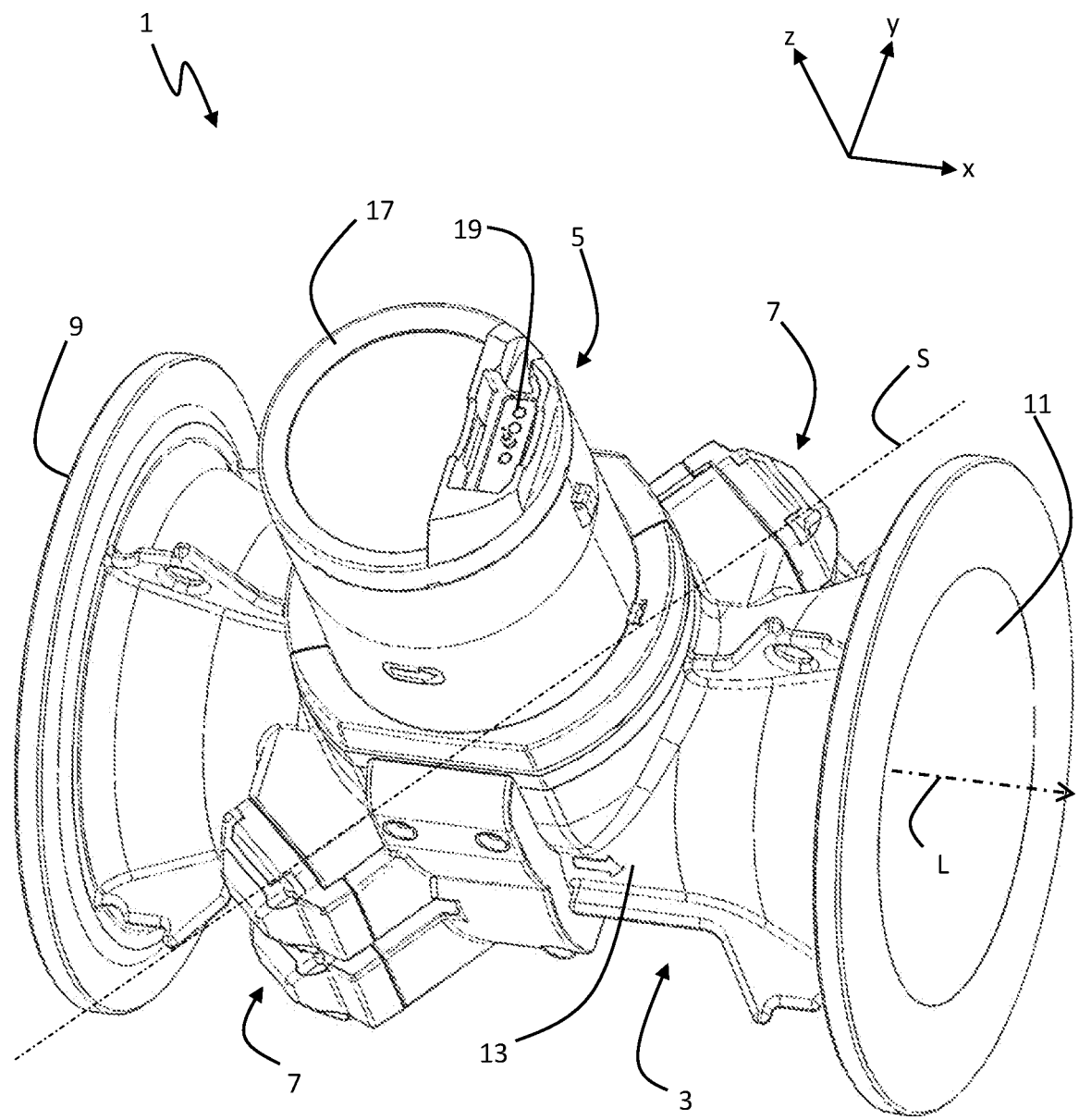
FIG. 1 is a first perspective view of an example of an embodiment of the flow meter disclosed herein.
Figure 2:
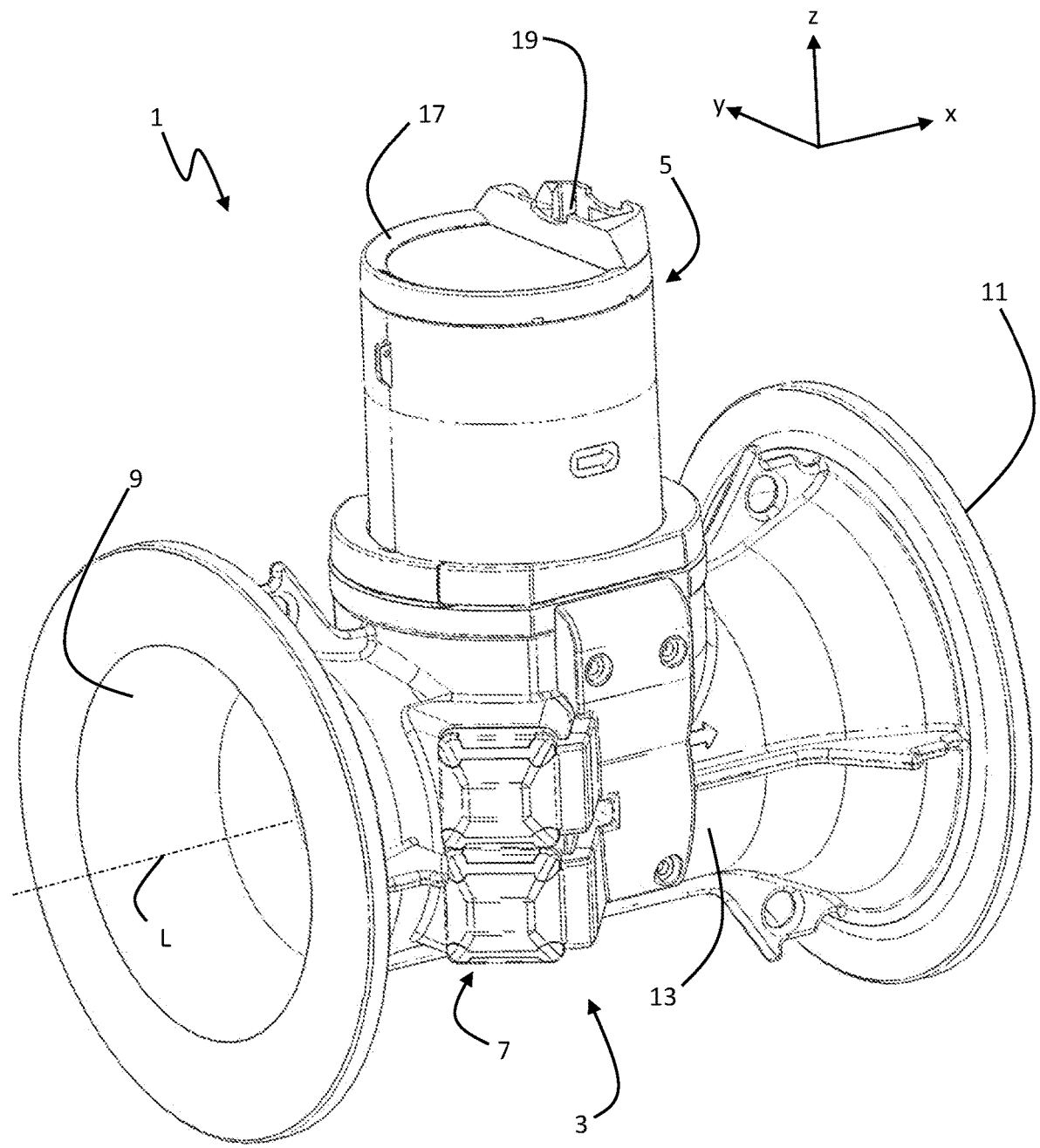
FIG. 2 is a different perspective view of the flow meter shown in FIG. 1.

Referring to the drawings, FIGS. 1 and 2 show a flow meter 1 in form of a large ultrasonic flow meter for measuring high fluid flows and for automatically transmitting wirelessly consumption values. The flow meter 1 comprises a flow tube element 3 and electronics housing 5 being releasably mounted to the flow tube element 3. The flow tube element 3 comprises sensors 7 in form of ultrasonic transducers being configured and arranged to generate signals for measuring a fluid flow through the flow tube element 3.

In order to facilitate the spatial orientation, each figure shows a local right-handed Cartesian coordinate system. The shown local coordinate system refers to an operational position when all components are installed and mounted for operation as shown in FIGS. 1, 3 and 4a-c. It should be understood that the flow meter 1 can be installed in any spatial orientation. However, in order to facilitate the description by using spatial terms like "up", "down", "axial" and "lateral", the z-axis shall be directed vertically upward, the x-axis shall be directed horizontally along a main flow direction L through the flow tube element 3, and the y-axis shall be directed horizontally perpendicular to the main flow direction L.

The flow tube element 3 defines the main flow direction L extending from a fluid inlet port 9 of the flow tube element 3 to a fluid outlet port 11 of the flow tube element 3. The fluid inlet port 9 and the fluid outlet port 11 are coaxially aligned to each other and to the main flow direction L. Each of the fluid inlet port 9 and fluid outlet port 11 comprise a connector flange for connecting a fluid pipe (not shown) to the flow tube element 3. The flow tube element 3 further defines a central flow section 13 located between the fluid inlet port 9 and the fluid outlet port 11. The central flow section 13 has a smaller inner diameter than the fluid inlet port 9 and the fluid outlet port 11 (see FIG. 3). Therefore, the crosssection through which the fluid flows through the flow tube element 3 is defined by the central flow section 13, where the cross-section is the smallest along the flow tube element 3.

The sensors 7 are arranged in dedicated sensor cavities defined at opposite lateral sides of the flow tube element 3. In the shown embodiment, the flow tube element 3 comprises two pairs of ultrasonic transducers 7, i.e. an upper pair and a lower pair. The ultrasonic transducers 7 of each pair face each other from opposite lateral sides of the flow tube element 3, wherein the pair of ultrasonic transducers define a main ultrasonic traveling axis S directed diagonally in the xy-plane.

Thereby, ultrasonic signals exchanged between the pair of ultrasonic transducers 7 along main ultrasonic traveling axis S have a motion component along the main flow direction L, or opposite to it, depending on the flow direction of the ultrasonic signals along the S-axis. Thereby, it is possible to determine a flow velocity from the ultrasonic signals as readily known by skilled person. As the inner cross-section of the central flow section 13 is known, a fluid flow through the flow tube element 3 can be deduced from the flow velocity. The fluid flow may be recorded over a certain period of time in a continuous, regular and/or sporadic manner in order to determine a consumed quantity, i.e., a total volume flowing through the flow tube element 3 over a certain period of time. The reception, processing, storing and/or transmitting of data is performed by electronics residing in the electronics housing 5.

The electronics housing 5 is mounted to a top side of the central flow section 13 of the flow tube element 3. The electronics housing 5 therefore comprises a bottom mounting side 15 at its bottom. In the shown embodiment, the electronics housing 5 has essentially a cylindrical shape with a vertical longitudinal axis (along the z-axis). The horizontal cross-sectional shape of the electronics housing 5 is thus essentially circular.

The electronics housing 5 cannot be opened without unmounting it from the flow tube element 3. A top side of the electronics housing is closed by a closing lid 17. A front face of the closing lid 17 is at least partially transparent to allow visual inspection of a display 18 located underneath. The electronics housing 5 further comprises an electric connection socket 19 at the axial top side of the electronics housing 5. The electrical connection socket 19 allows for connecting an external power supply (not shown) to be optionally connected during maintenance and/or times of expected high electric energy consumption. The electric connection socket 19 may further provide the possibility to: extract data for further processing and/or transmission; and/or to set parameters; and/or to upload a program or a program update.

During normal operation of the flow meter 1, the flow meter 1 is battery-powered and independent of an external power supply. The electrical connection socket 19 is not used during normal operation of the flow meter 1.

Figure 3:
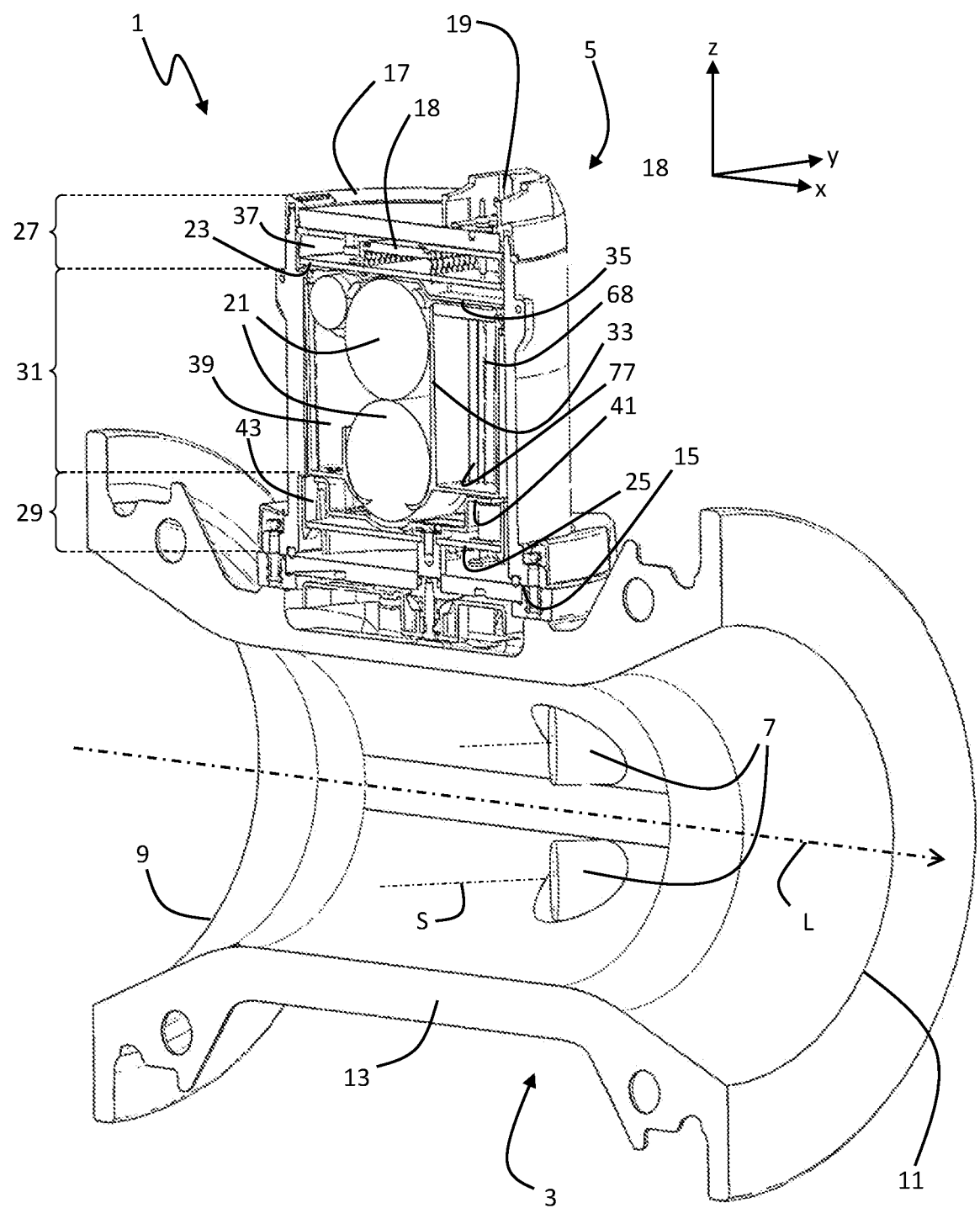
FIG. 3 is a longitudinal cut view of the flow meter shown in FIGS. 1 and 2.
Figure 5:
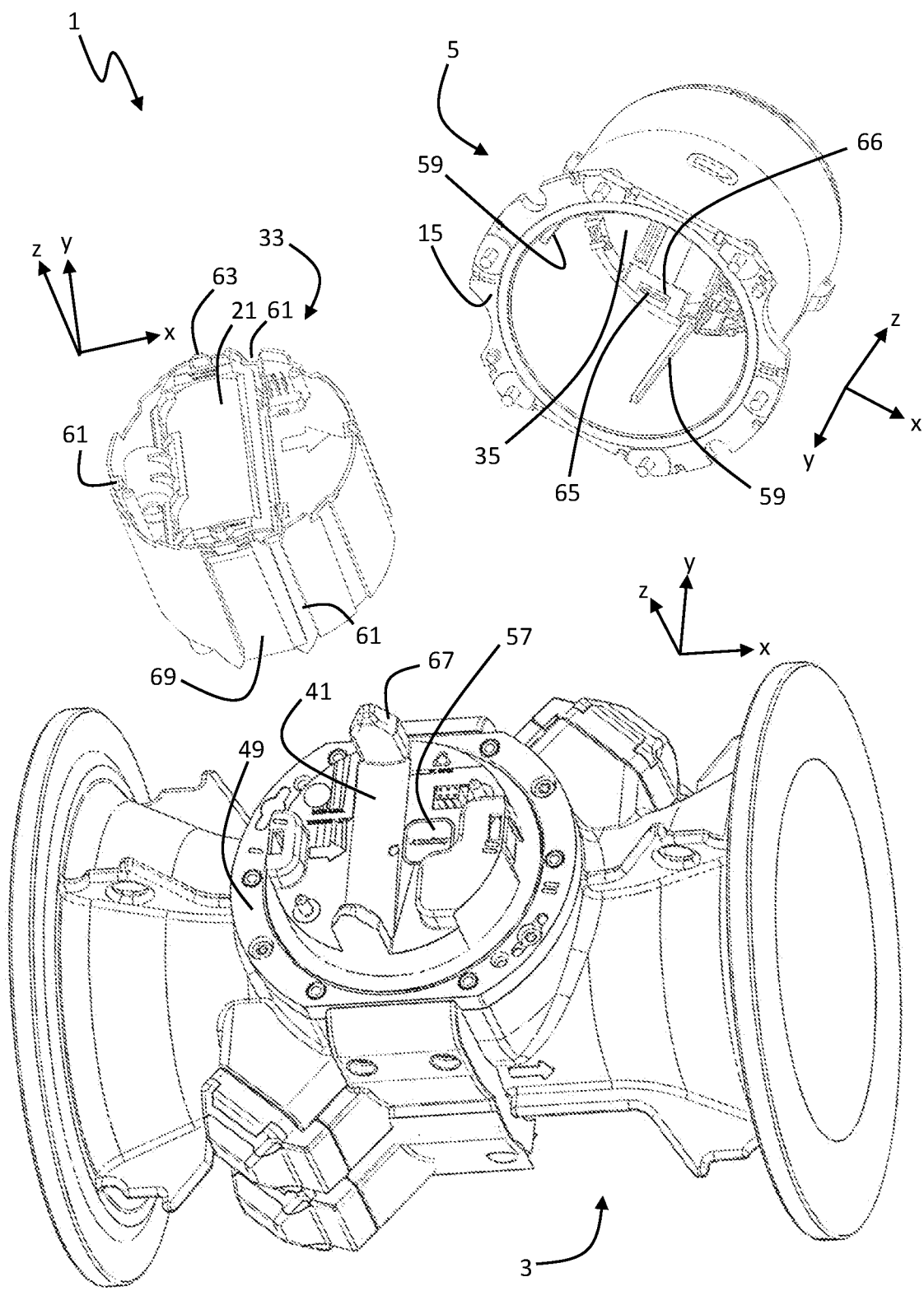
FIG. 5 is a perspective view of the flow meter shown in in FIGS. 1-3 and 4a-c when the electronics housing is unmounted and the battery cartridge pulled out of its operating position for replacement.

As shown in FIG. 3, the electronics housing 5 accommodates a battery or batteries 21 in the form of two D-type battery cells. The electronics housing 5 further accommodates electronics located on two separate printed circuit boards (PCB) 23, 25. A first PCB 23 extends in a horizontal xy-plane in a top section 27 of the electronics housing 5. The first PCB 23 contains a first part of the electronics in the electronics housing 5. The display 18 is one component of the first part of the electronics on the first PCB 23. Preferably, the first PCB 23 further comprises a signal transmitter and an antenna and/or antenna connectors for wirelessly transmitting consumption values to an automatic reading system (not shown). A second PCB 25 extends parallel to the first PCB 23 in a horizontal xy-plane in a bottom section 29 of the electronics housing 5. The battery 21 is located in a battery cartridge 33 arranged in a central section 31 of the electronics housing 5 between the top section 27 and the bottom section 29. Thus, the battery cartridge 33 is located within the electronics housing 5 between the first PCB 23 and the second PCB 25. This is the operating position of the battery cartridge 33 as shown in FIG. 3 when the electronics housing 5 is mounted to the flow tube element 3. As shown in FIG. 5 and described below, the battery cartridge 33 is removable from the electronics housing 5 through the bottom mounting side 15 of the electronics housing 5 when the electronics housing 5 is unmounted from the flow tube element 3.

A first antitampering element 35 is located within the electronics housing 5 underneath the first PCB 23. The first PCB 23 on its lower side (facing the anti-tampering plate 35) is free-at least in its middle portion-from electronics in order to make room for the first anti-tampering element 35 and the batteries 21 (cf FIG. 6c). The first anti-tampering element 35 is essentially disc-shaped and extends essentially in a horizontal xy-plane between the battery cartridge 33 and the first PCB 23. The first anti-tampering element 35 separates a first cavity 37 within the top section 27 of the electronics housing 5 from a second cavity 39 within the central section 31 of the electronics housing 5. The first anti-tampering element 35 is made as a thin plate in order not to increase the height of the electronics housing 5 more than necessary (cf FIG. 7). The first cavity 37 contains the first PCB 23 with the first part of the electronics. The first anti-tampering element 35 blocks access to the first cavity 37 from below. The second cavity 39 contains the removable battery cartridge 33 and is accessible through the bottom mounting side 15 of the electronics housing 5 when the electronics housing 5 is unmounted from the flow tube element 3.

The second PCB 25 contains a second part of the electronics in the electronics housing 5, wherein the second part of the electronics comprises electronic components for receiving and processing signals generated by the sensors 7. The electronics on the second PCB 25 is protected against tampering by a second anti-tampering element 41 that is mounted to the flow tube element 3 independently from the electronics housing 5. Thereby, the second PCB 25 and the second anti-tampering element 41 remain mounted to the flow tube element 3 when the electronics housing 5 is unmounted from the flow tube element 3. The second anti-tampering element 41 is essentially cup-shaped and nested in a third cavity 43 in the bottom section 29 of the electronics housing 5. The third cavity 43 of the electronics housing 5 is defined in the electronics housing 5 between the battery cartridge 33 and the bottom mounting side 15 of the electronics housing 5. The second anti-tampering element 41 and the second part of the electronics on the second PCB 25 reside at least partly within the third cavity 43 of the electronics housing 5. The second anti-tampering element 41 substantially fills the third cavity 43 within the bottom section 29 of the electronics housing 5.

Figure 4A:
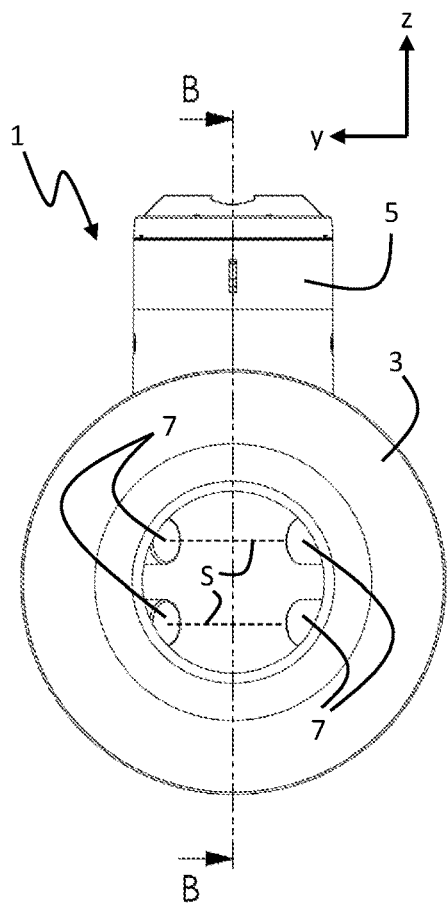
FIG. 4a is a side view of the flow meter shown in FIGS. 1-3.
Figure 4B:
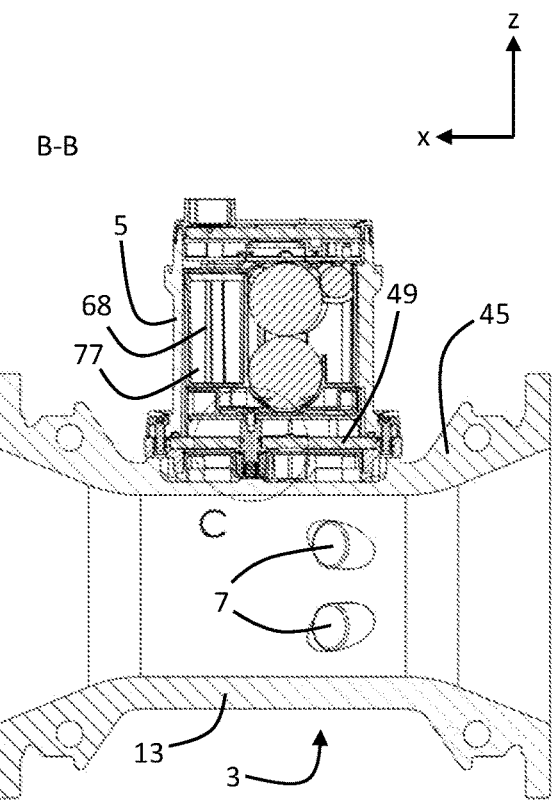
FIG. 4b is a longitudinal cut view of the flow meter shown in FIGS. 1-3.
Figure 4C:
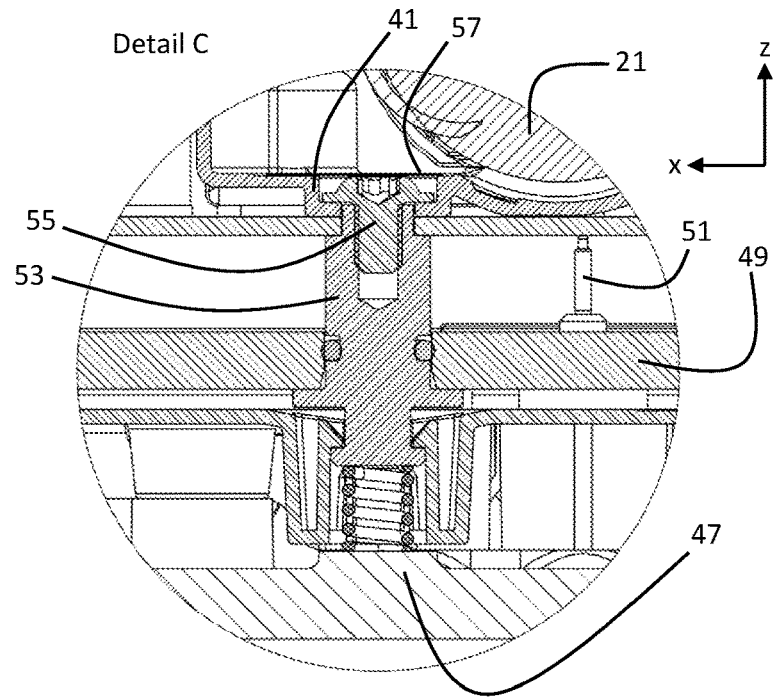
FIG. 4c is a detailed view of the flow meter shown in FIGS. 1-3.

FIGS. 4a-c show how the second anti-tampering element 41 is securely mounted to the flow tube element 3. The flow tube element 3 comprises a main body 45 made of steel defining an upper mounting portion 47. The flow tube element 3 is further equipped with a mounting base 49 in form of a framed glass plate being fixed to the mounting portion 47 of the main body 45. The mounting base 49 comprises vertically electrical contacts 51 for establishing an electrical connection between the sensors 7 and the bottom of the second PCB 25. An anchor element 53 protrudes vertically from below through the mounting base 49 to receive a securing screw 55 at its top end. The anchor element 53 protrudes also through the second PCB 25 with its top end. The head of the securing screw 55 pushes the second anti-tampering element 41 downward onto the second PCB 25 and secures both the second anti-tampering element 41 and the second PCB 25 to the mounting base 49 by means of the anchor element 53. The head of the securing screw 55 is sunk into the second anti-tampering element 41, such that a security seal 57 in form of a vulnerable sticker can be placed on the second anti-tampering element 41 to indicate that the securing screw 55 is not tampered with. A broken security seal 57 would indicate that the securing screw 55 may have been unscrewed for taking off the second anti-tampering element 41 for accessing the electronics on the second PCB 25. The securing screw 55 has a further function, namely creating electrical ground connection between PCB 25 and the metallic main body 45 of the flow tube element 3. This electrical ground connection is relevant for EMC protection and for the ultrasonic flowmeter passing electrical approval tests.

FIG. 5 shows how the battery cartridge 33 is removed from the electronics housing 5. Preferably, the completely equipped battery cartridge 33 is replaced as a whole unit. The electronics housing 5 is unmounted from the mounting base 49 of the flow tube element 3 and pulled vertically off the flow tube element 3. Thereby, the third cavity 43 in the bottom section 29 of the electronics housing 5 becomes accessible through the bottom mounting side 15 of the electronics housing 5. The second PCB 25 remains at the flow tube element 3 and is protected against tampering by the second anti-tampering element 41 being secured to the mounting base 49 of the flow tube element 3. The battery cartridge 33 can now be pulled out of the bottom mounting side 15 of the electronics housing 5 and replaced by another battery cartridge 33 equipped with a fresh battery 21. The cartridge 33 is exchangeable by hand, i.e.

after lifting the electronics housing 5 the cartridge 33 can be removed with bare hands.

Depending on whether the frictional contact between the battery cartridge 33 and the second anti-tampering element 41 and/or the electrical connection with the second PCB 25 is smaller or larger than the frictional contact between the battery cartridge 33 and the electronics housing 5 and/or the electrical connection with the first PCB 23, the battery cartridge 33 is pulled off the flow tube element 3 together with the electronics housing 5 or remains on the flow tube element 3 when the electronics housing 5 is pulled off. In the latter case, the battery cartridge 33 can be easily pulled off manually off the flow tube element 3 for replacement.

The electronics housing 5 defines in the shown embodiment three inner positive fit elements 59 in form of longitudinal ribs extending along the z-axis. The battery cartridge 33 comprises corresponding female outer positive fit elements 61 in form of longitudinal slots extending along the z-axis. Thereby, the rotational orientation of the battery cartridge 33 relative to the electronics housing 5 in the xy-plane is well defined in order to ensure a designated electrical and mechanical contact between the battery cartridge 33 and the first part of the electronics on the first PCB 23 (not visible in FIG. 5) residing within the first cavity 37 of the electronics housing 5. As can been seen in FIG. 5, the first part of the electronics on the first PCB 23 is protected against tampering by the first anti-tampering element 35. The battery cartridge 33 comprises contact blades 63 extending vertically upward at a top side of the battery cartridge 33 in order to cut into female receptors 65 arranged at the first PCB 23. The first anti-tampering element 35 has openings 66 to allow the contact blades 63 to cut into the female receptors 65 of the first PCB 23. The battery cartridge 33 further comprises a vertically through going electrical connection 68 electrically connecting the first PCB 23 with the second PCB 25. Both the first PCB 23 and the second PCB 25 comprise connection sockets for receiving pins of the electrical connection 68 of the battery cartridge 33 to be plugged in. Software codes in the electronics of the first PCB 23 and the second PCB 25 are activated to ensure that these PCBs 23 and 25 still is a matching pair after replacement of the cartridge 33.

Once a new battery cartridge 33 is inserted and plugged into the electronics housing 5, the electronics housing 5 can be mounted to the flow tube element 3. In order to guide the electronics housing 5 in a well-defined manner regarding the rotational orientation in the xy-plane relative to the flow tube element 3, the second anti-tampering element 41 defines in the shown embodiment two positive fit elements 67 engaging with two corresponding female positive fit element 69 of the battery cartridge 33. The positive fit elements 67 of the second anti-tampering element 41 are formed as vertically extending webs that are supposed to protrude into the vertically extending slot-shaped form fit elements 69 at lateral sides of the battery cartridge 33.

Figure 6A:
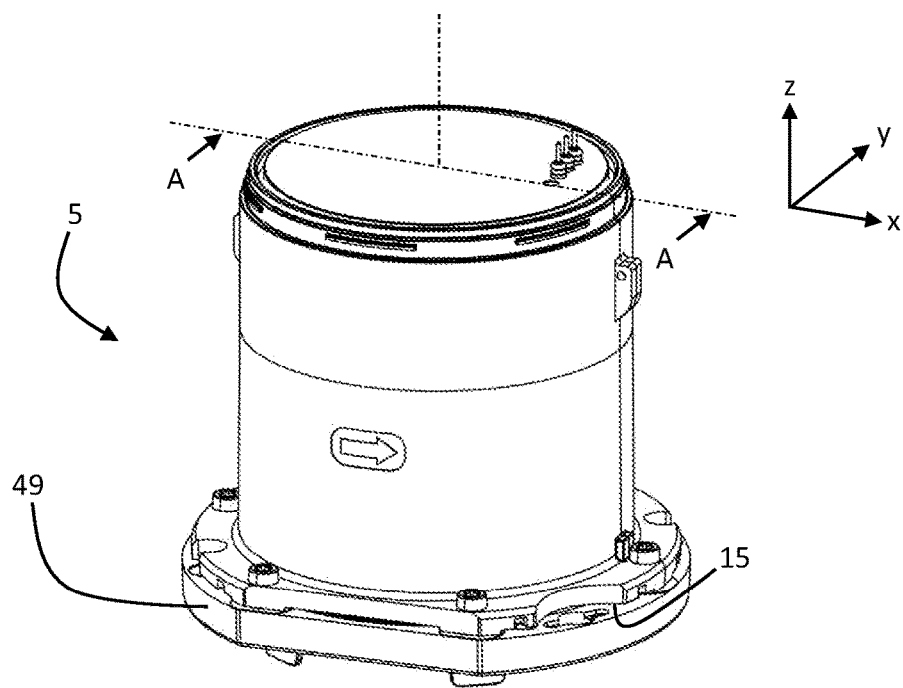
FIG. 6a is a perspective view along plane A-A of the electronics housing of the flow meter shown in FIGS. 1-3, 4a-c and 5.
Figure 6B:
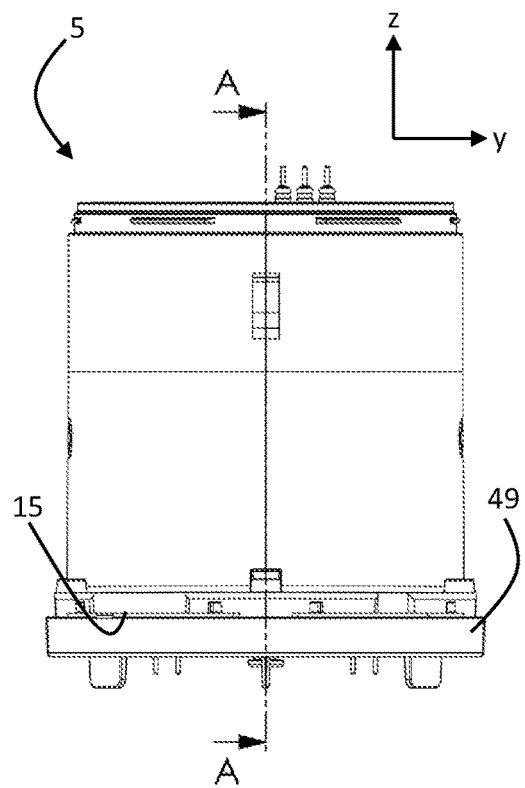
FIG. 6b is a side cut view along plane A-A of the electronics housing of the flow meter shown in FIGS. 1-3, 4a-c and 5.
Figure 6C:
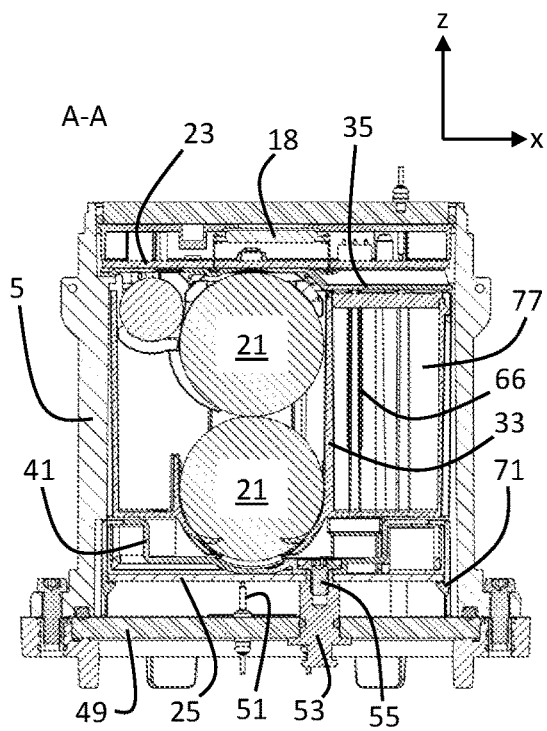
FIG. 6c is a longitudinal cut view along plane A-A of the electronics housing of the flow meter shown in FIGS. 1-3, 4a-c and 5.
Figure 7:
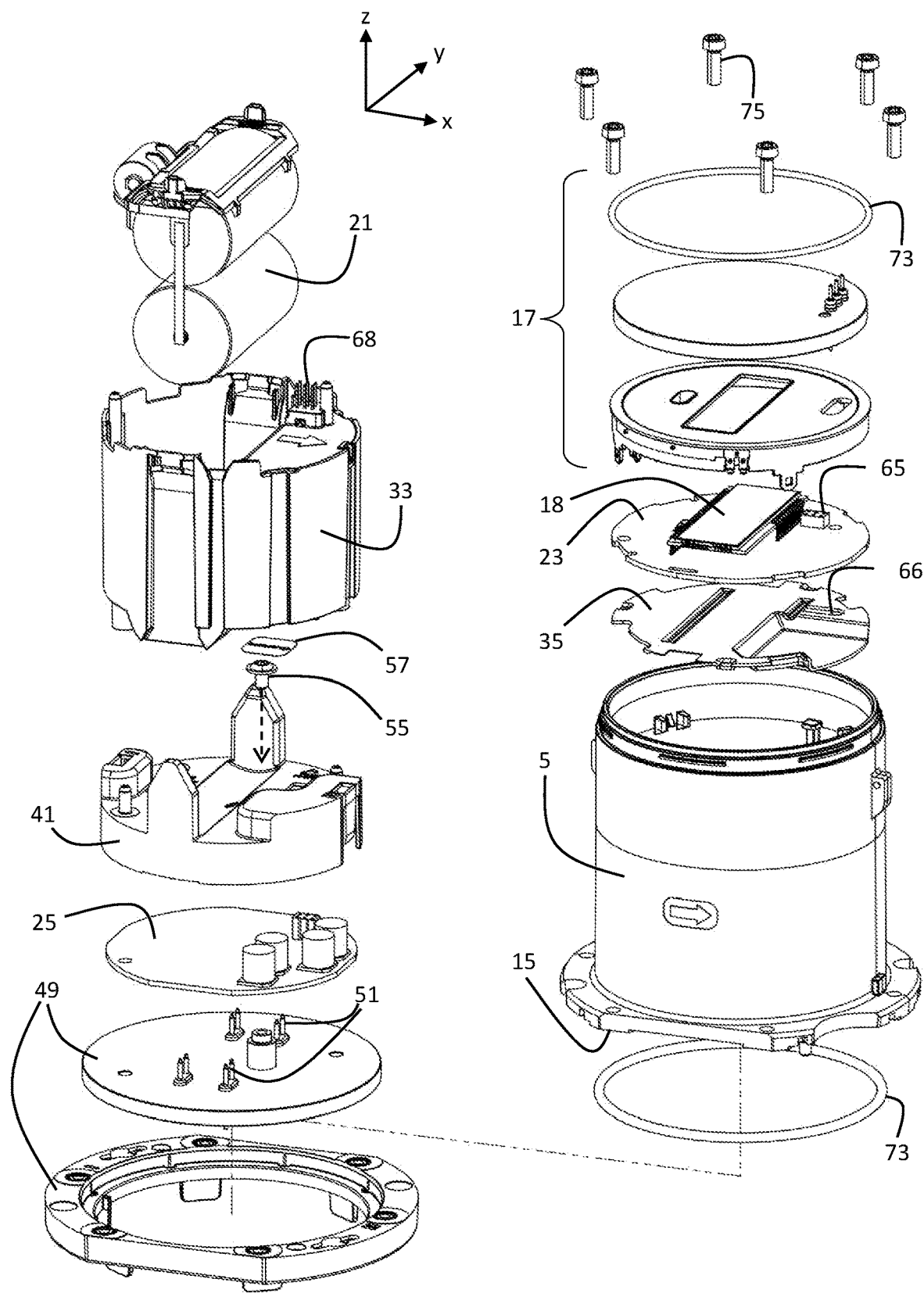
FIG. 7 is an exploded view of the electronics housing of the flow meter shown in FIGS. 1-3, 4a-c, 5 and 6a-c.

As can be seen in FIGS. 6*a-c*, the second anti-tampering element 41 further comprises hooks 71 snapping under the second PCB 25 in order to protect the second part of the electronics on the second PCB from a lateral tampering attack. FIG. 6*c* also shows clearly the through going electrical connection 68 provided in the battery cartridge 33, so that the second PCB 25 and the sensors 7 are powered by the battery 21 via the first PCB 23 and the electrical connection 68. FIG. 7 shows the individual components of the electronics housing 5, the battery cartridge 33 and the mounting base 49. The mounting base 49 is shown in FIG. 7 separated into a glass plate and a mounting frame. There are eight electric contacts 51 in form of pins provided to go through the glass plate of the mounting base 49, i.e. two pins 51, one pin 51 for each of the ultrasonic transducers 7. The second PCB 25 comprises corresponding contact points at its bottom side for being contacted by the pins 51.

The electronics housing 5 is watertightly sealed by O-rings 73 at the top side and the bottom mounting side 15. The upper O-ring 73 is pressed by the closing lid 17 to an upper rim of the electronics housing 5. The lower O-ring is pressed downward by the bottom mounting side 15 of the electronics housing 5 against the glass plate of the mounting base 49 when the electronics housing 5 is fastened by screws 75 to the mounting base 49. Instead of these fixing screws 75 the electronics housing 5 could be threaded and fixed in a corresponding thread on the mounting base 49.

Figure 8A:
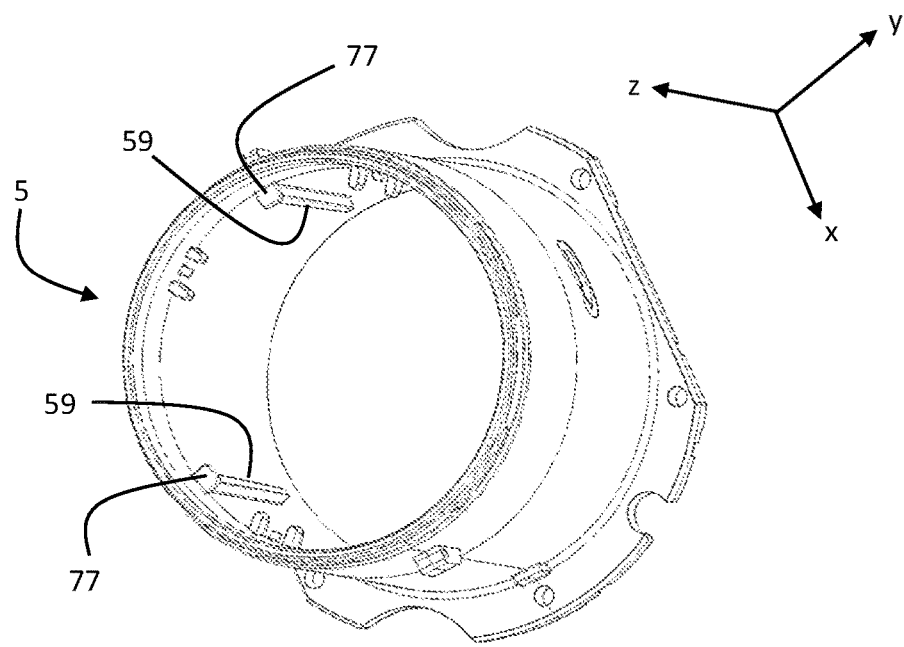
FIG. 8a, FIG. 8b, and FIG. 8c are different perspective views of the electronics housing of the flow meter shown in FIGS. 1-3, 4a-c, 5, 6a-c, 7 and 8a-c without battery cartridge and any electronics.
Figure 8B:
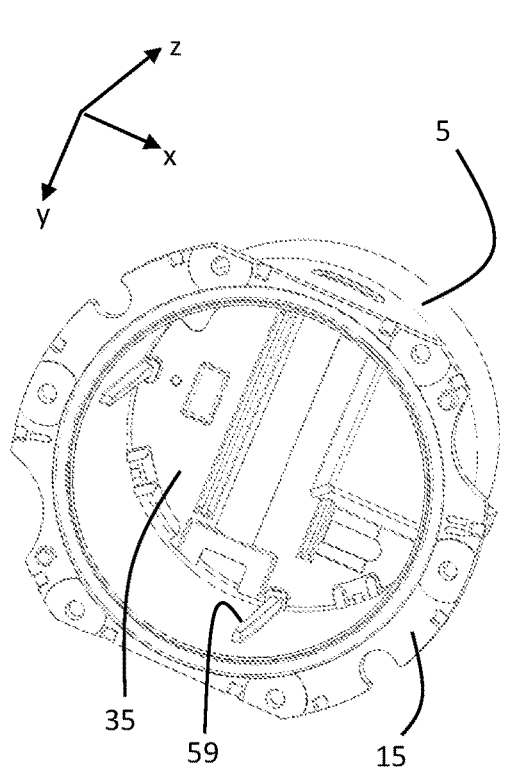
Figure 8C:
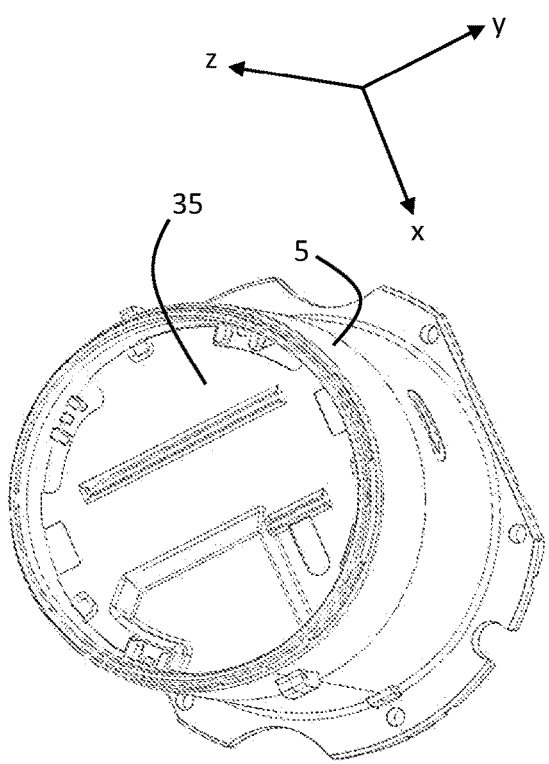

FIG. 8*a* shows the electronics housing 5 alone without any component installed therein. As can be seen, an axial top end of each of the three inner positive fit elements 59 provides a support surface 77 facing upward away from the bottom mounting side 15. The first anti-tampering element 35 rests on these support surfaces 77 as shown in FIG. 8*b*. During the assembling process, the first anti-tampering element 35 is thus inserted as the first component into the electronics housing 5 from the opened top side. The installation of the first PCB 23 and the closing of the top side by the closing lid 17 follows later in the assembling process.

Figure 9A:
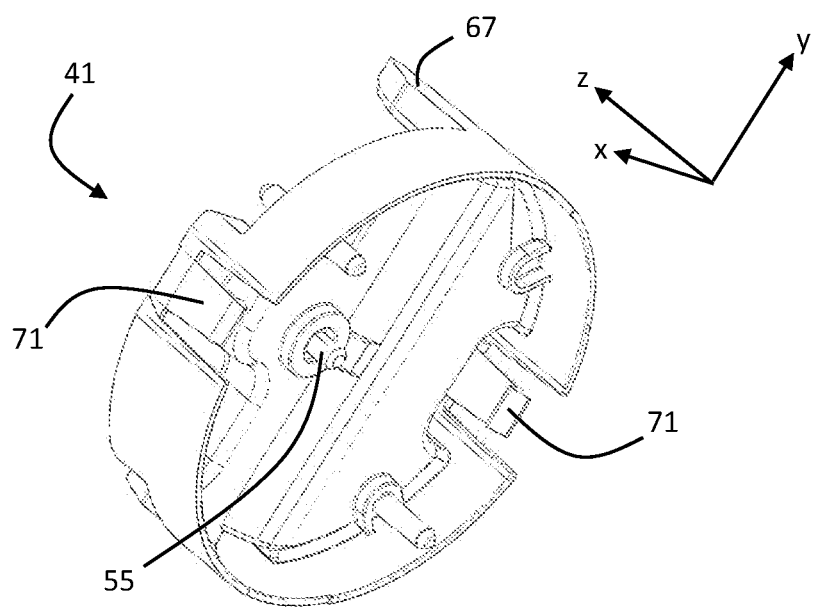
FIG. 9a, FIG. 9b, and FIG. 9c are different perspective views of the second anti-tampering element of the flow meter shown in FIGS. 1-3, 4a-c, 5, 6a-c, 7 and 8a-c without battery cartridge and any electronics.
Figures 9B, 9C:
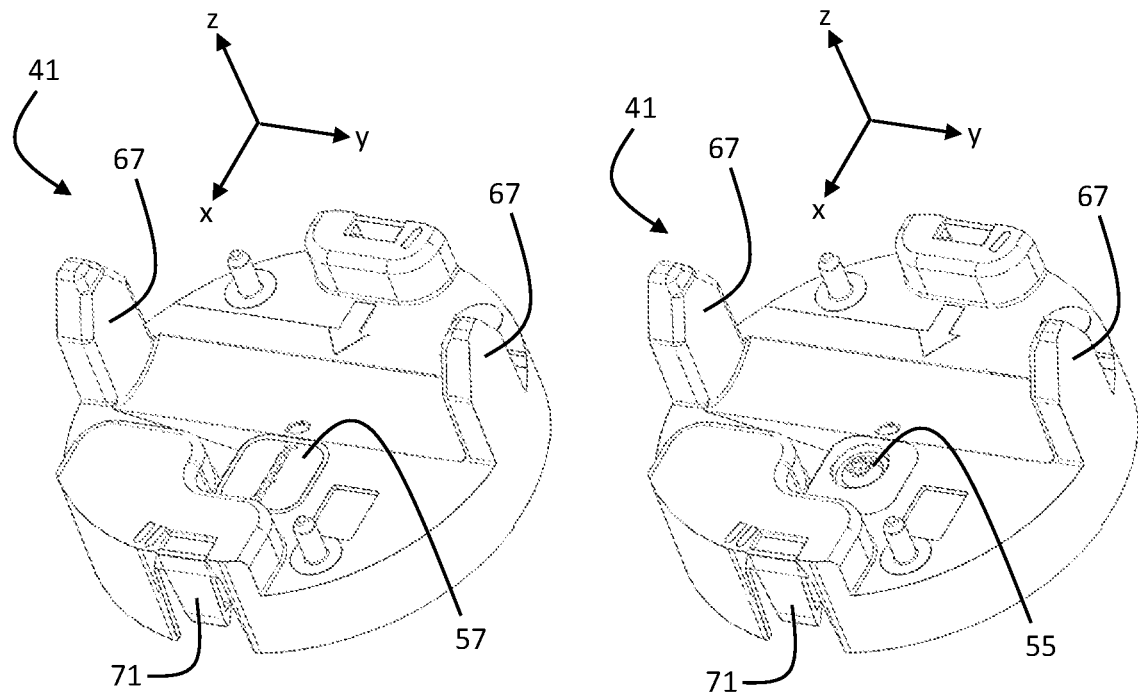

FIGS. 9*a-c* show the second anti-tampering element 41 in more detail. The perspective bottom view of FIG. 9*a* shows in particular how the second anti-tampering element 41 is secured by the securing screw 55 and the hooks 71. FIG. 9*b* shows the second anti-tampering element 41 with the security seal 57 in form of a vulnerable sticker being sticked on to cover the head of the security screw 55. FIG. 9*c* shows the second anti-tampering element 41 before the security seal 57 is sticked on, so that the head of the security screw 55 is visible.

Figure 10A:
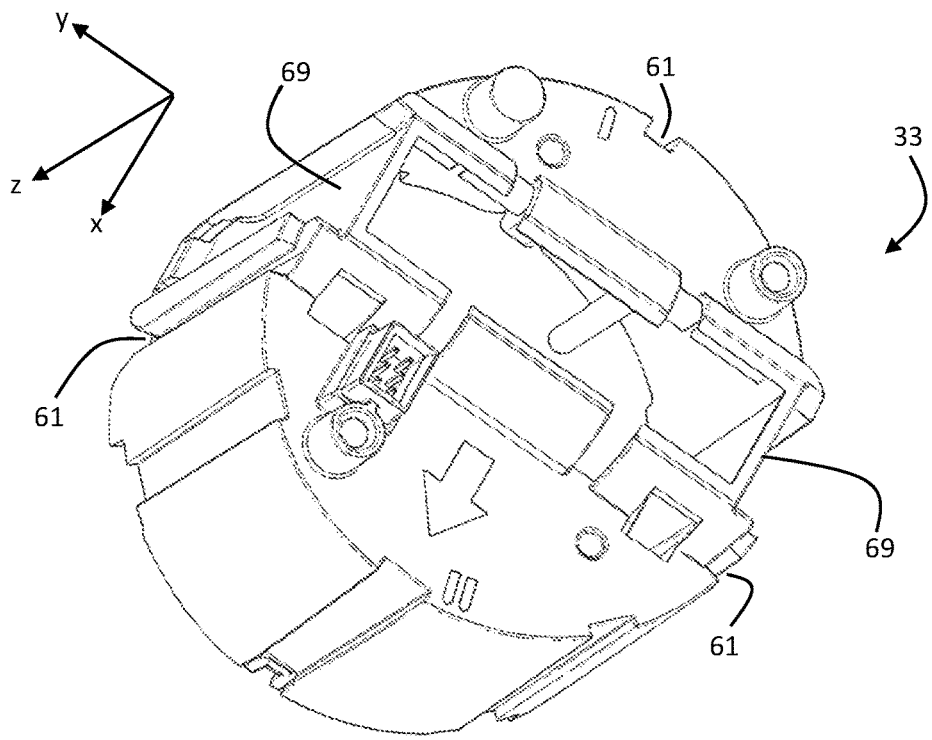
FIG. 10a and FIG. 10b are different perspective views of the battery cartridge of the flow meter shown in FIGS. 1-3, 4a-c, 5, 6a-c, 7, 8a-c and 9a-c without battery and any connections.
Figure 10B:
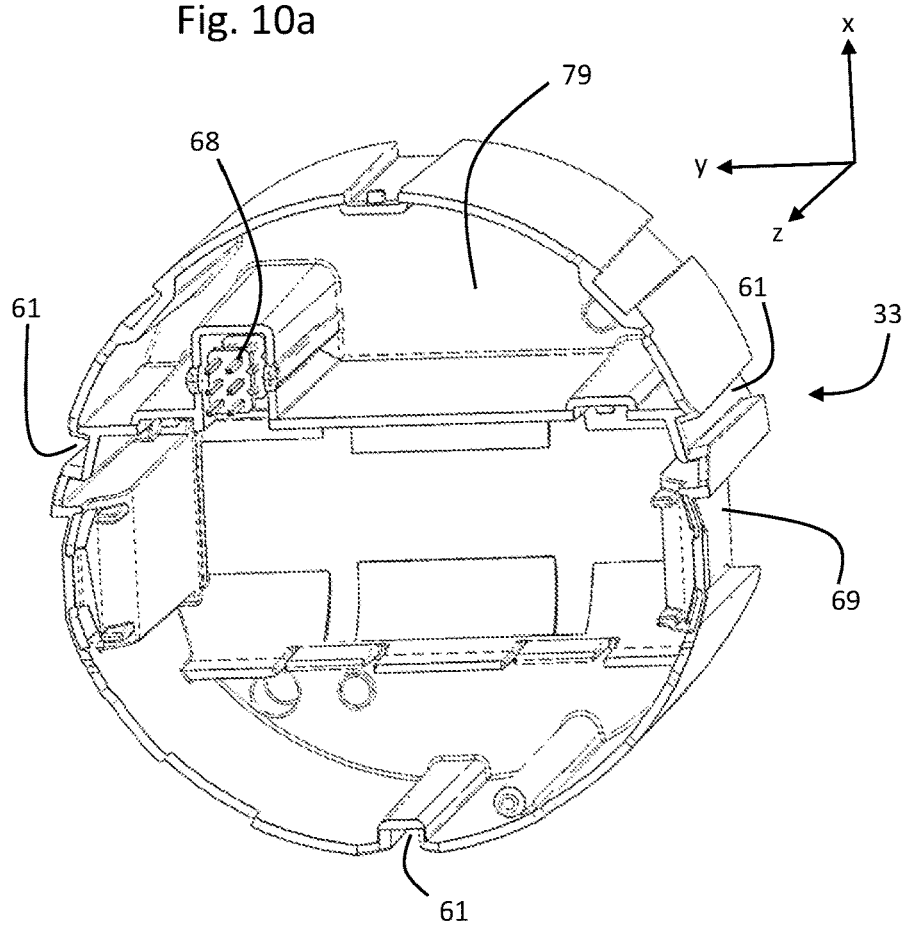

FIGS. 10*a,b* show the battery cartridge 33 without batteries 21. As can be seen in FIG. 10*b* in particular, the battery cartridge 33 defines a desiccant cavity 79 located lateral from the batteries 21. The desiccant cavity 79 is at least partly filled with a desiccant during the assembling process. The desiccant may be packaged or dumped into the desiccant cavity 79 as a bulk. If it is not packaged, it is beneficial that the desiccant cavity 79 is a closed cavity for securely enclosing desiccant as a bulk. The desiccant cavity 79 of the battery cartridge 33 is very useful, because it is exchanged together with the batteries 21 as a whole unit, so that the desiccant is replaced automatically by each battery replacement. It is also useful for storage and shipping of the battery cartridges 33 as a spare part of the flow meter 1.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents While specific embodiments of the invention have been shown and described in detail to illustrate the application of the principles of the invention, it will be understood that the invention may be embodied otherwise without departing from such principles.

LIST OF REFERENCE NUMERALS:

1 flow meter
3 flow tube element
5 electronics housing
7 sensors
9 fluid inlet port
11 fluid outlet port
13 central flow section
15 mounting side of electronics housing
17 closing lid
18 display
19 electrical connection socket
21 battery
23 first PCB
25 second PCB
27 top section of electronics housing
29 bottom section of electronics housing
31 central section of electronics housing
33 battery cartridge
35 first anti-tampering element
37 first cavity of electronics housing
39 second cavity of electronics housing
41 second anti-tampering element
43 third cavity of electronics housing
45 main body of flow tube element
47 mounting section of main body of the flow tube element
49 mounting base
51 electrical contacts/pins
53 anchor element
55 securing screw
57 security seal
59 inner positive fit element of electronics housing
61 outer positive fit element of battery cartridge
63 contact blades
65 female receptors
66 openings in the first anti-tampering element
67 positive fit element of a second anti-tampering element
68 electrical connection
69 positive fit element of battery cartridge
71 hooks
73 O-rings
75 screws
77 support surfaces
79 desiccant cavity

What is claimed is:

1. A flow meter comprising:
a flow tube element, the flow tube element comprising sensors configured and arranged to generate signals for measuring a fluid flow through the flow tube element;
an electronics housing, the electronic housing comprising a mounting side, wherein the mounting side is releasably mounted directly or indirectly to the flow tube element;
a battery cartridge;
a battery located in the battery cartridge, wherein the battery cartridge is arranged in an operating position within the electronics housing and removable from the electronics housing through the mounting side with the electronics housing unmounted from the flow tube element;
electronics accommodated in the electronic housing, wherein the electronics and/or the sensors are powered by the battery, the electronics comprising a first part of the electronics and a second part of the electronics;
a first anti-tampering element arranged between the first part of the electronics and the battery cartridge in the operating position, the first anti-tampering element being configured to protect the first part of the electronics against tampering; and
a second anti-tampering element mounted directly or indirectly to the flow tube element independently from the electronics housing, the second anti-tampering element being configured to protect the second part of the electronics against tampering and being configured so that the second part of the electronics and the second anti-tampering element remain mounted to the flow tube element with the electronics housing unmounted from the flow tube element.

2. The flow meter in accordance with claim 1, wherein the second anti-tampering element is cup-shaped and the second part of the electronics resides at least partly within a cavity of the flow tube element.

3. The flow meter in accordance with claim 1, wherein the first anti-tampering element is disc-shaped and separates a first cavity within the electronics housing from a second cavity within the electronics housing, wherein the first cavity is inaccessible and contains the first part of the electronics, and wherein the second cavity is accessible through the mounting side and contains the removable battery cartridge.

4. The flow meter in accordance with claim 3, wherein a third cavity is defined in the electronics housing between the battery cartridge in the operating position and the mounting side of the electronics housing, wherein the second anti-tampering element and the second part of the electronics resides at least partly within the third cavity.

5. The flow meter in accordance with claim 1, wherein the first part of the electronics is located on a first printed circuit board (PCB) and wherein the second part of the electronics is located on a second printed circuit board (PCB).

6. The flow meter in accordance with claim 5, wherein the first PCB and the second PCB are arranged parallel to each other and/or parallel to the mounting side of the electronics housing.

7. The flow meter in accordance with claim 1, wherein the flow tube element further comprises:
a metallic main body defining a flow tube;
pipe mounting flanges;
sensor cavities accommodating the sensors; and
a mounting portion to which the electronics housing is releasably mounted.

8. The flow meter in accordance with claim 7, wherein the second anti-tampering element is directly or indirectly fixed to the metallic main body at the mounting portion of the metallic main body.

9. The flow meter in accordance with claim 1, wherein the second part of the electronics is located closer to the flow tube element than the first part of the electronics, wherein the battery cartridge in the operating position is located between the first part of the electronics and the second part of the electronics.

10. The flow meter in accordance with claim 1, wherein the first anti-tampering element is fixed within the electronics housing.

11. The flow meter in accordance with claim 1, wherein the battery cartridge defines a desiccant cavity at least partly filled with a desiccant.

12. The flow meter in accordance with claim 1, wherein the battery cartridge comprises an electrical connection protruding through an opening in the first anti-tampering element to connect to the first part of the electronics and protruding through an opening in the second anti-tampering element to connect to the second part of the electronics.

13. The flow meter in accordance with claim 1, wherein the electronics housing defines at least one inner positive fit element engaging with at least one corresponding outer positive fit element of the battery cartridge for a defined guiding of the battery cartridge into and out of the operating position.

14. The flow meter in accordance with claim 1, wherein the second anti-tampering element defines at least one positive fit element engaging with at least one corresponding positive fit element of the battery cartridge for a defined guiding of the electronics housing with the electronics housing mounted to the flow tube element.

15. The flow meter in accordance with claim 1, wherein the electronics housing comprises a closing lid at a side opposite to the mounting side and forms a cup-shape only accessible through the mounting side when the electronics housing is unmounted from the flow tube element.

16. The flow meter in accordance with claim 1, wherein the electronics housing comprises a mounting flange at the mounting side of the electronics housing.

17. The flow meter in accordance with claim 1, wherein the first part of the electronics is configured to display values and/or transmit wirelessly values to an automatic reading system, and wherein the second part of the electronics is configured to receive and/or process the signals generated by the sensors.

18. The flow meter in accordance with claim 1, wherein the flow meter is an ultrasonic flow meter, and wherein the sensors are ultrasonic transducers.

19. A flow meter comprising:
a flow tube element, the flow tube element comprising sensors configured and arranged to generate signals for measuring a fluid flow through the flow tube element;
an electronics housing comprising a mounting side, the electronics housing being configured to be in a mounted position and an unmounted position, wherein the mounting side is releasably mounted directly or indirectly to the flow tube element in the mounted position, the mounting side facing in a direction of the flow tube element with the electronics housing in the mounted position;
a battery cartridge;
a battery located in the battery cartridge, wherein the battery cartridge is arranged in an operating position within the electronics housing and removable from the electronics housing through the mounting side with the electronics housing in the unmounted position;
electronics accommodated in the electronic housing, wherein the electronics and/or the sensors are powered by the battery, the electronics comprising a first part of the electronics and a second part of the electronics;
a first anti-tampering element arranged between the first part of the electronics and the battery cartridge in the operating position, the first anti-tampering element being configured to protect the first part of the electronics against tampering; and
a second anti-tampering element mounted directly or indirectly to the flow tube element independently from the electronics housing, the second anti-tampering element being configured to protect the second part of the electronics against tampering and being configured so that the second part of the electronics and the second anti-tampering element remain mounted to the flow tube element with the electronics housing in the unmounted position.

20. The flow meter in accordance with claim 19, wherein the electronics housing is configured to be located at a spaced location from the second anti-tampering element in the unmounted position.

* * * * *